INVENTORS
Robert L. Gephart
Robert M. VanHouse
BY
D. D. McGraw
THEIR ATTORNEY

INVENTORS
Robert L. Gephart
Robert M. VanHouse
BY
D. D. McGraw
THEIR ATTORNEY

INVENTORS
Robert L. Gephart
Robert M. VanHouse
THEIR ATTORNEY

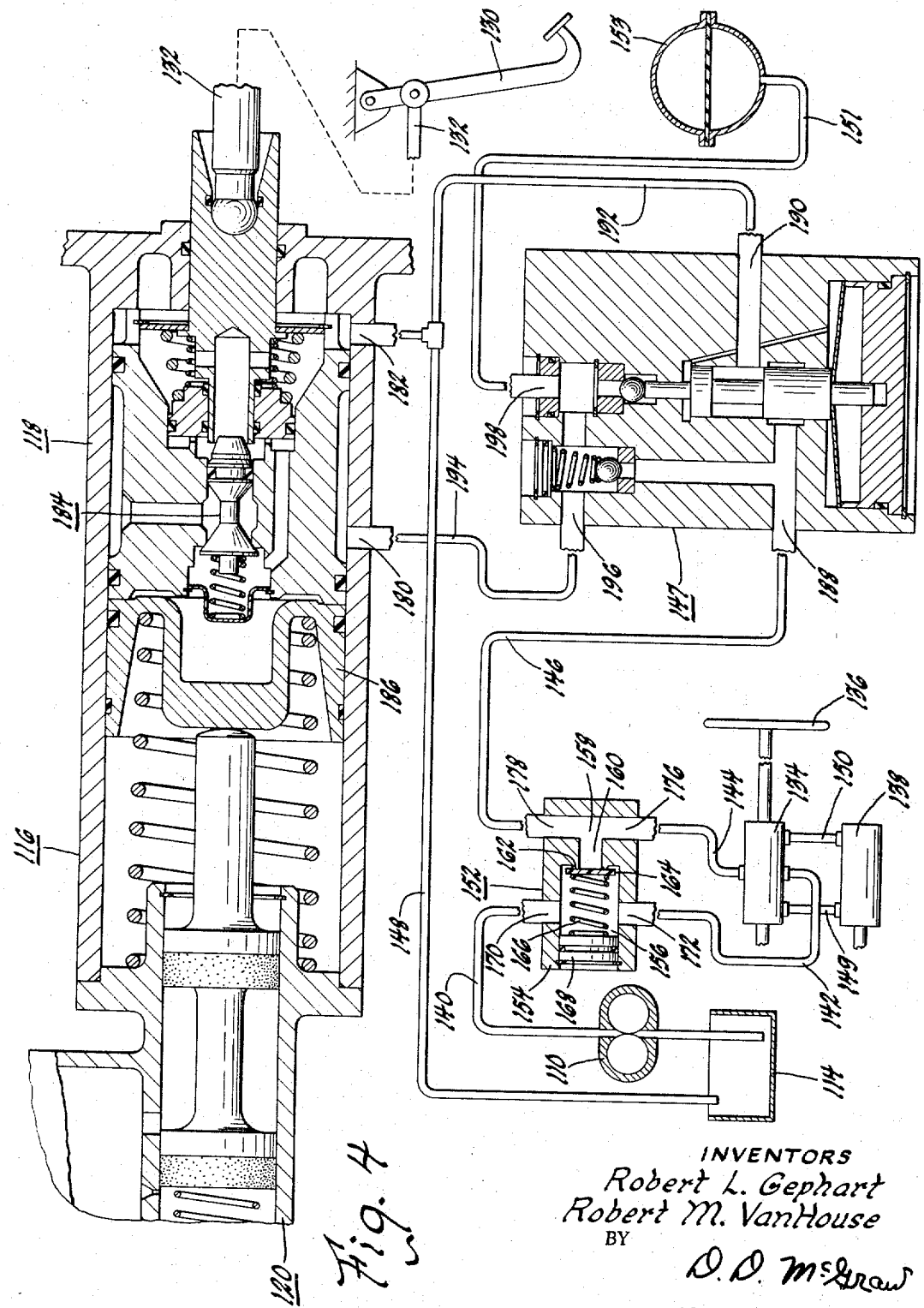

United States Patent Office 3,364,821
Patented Jan. 23, 1968

3,364,821
VALVING FOR HYDRAULIC POWER
BRAKE SYSTEM
Robert L. Gephart, Spring Valley, and Robert M. Van House, Dayton, Ohio, assignors to General Motors Corporation, Detroit, Mich., a corporation of Delaware
Filed June 27, 1963, Ser. No. 291,156
4 Claims. (Cl. 91—411)

The invention relates to a valve construction especially adapted for utilization in a hydraulic power brake system, and more particularly to a valve construction for use in such a system receiving hydraulic power pressure from a source which also supplies other hydraulic power components such as the power steering gear mechanism. When a common pressure source is utilized to supply separately operable components, it is desirable that the components be able to operate each independently of the other so that should one component fail the other component will remain operable. This is especially true when one of the components is a vehicle brake operating system. It is of prime importance that the vehicle brakes be operable to stop the vehicle even though the power steering mechanism becomes inoperative.

The valve mechanism embodying the invention provides for delivery of pressurized fluid to a power steering gear from a pressurizing pump and the receipt of pressurized fluid from the steering gear, after which the pressurized fluid is delivered to the power brake system and then returned to the pump reservoir. Should the power brake malfunction so that a continuous flow of fluid cannot be maintained, the valve mechanism embodying the invention will allow fluid to circulate from the power steering gear and be returned in such a manner that the power steering gear system remains operative. Should the power steering gear system malfunction or for any reason fail to return pressurized fluid for use by the power brake system, the valve mechanism permits supply of pressurized fluid to the power brake without first passing it through part of the power steering gear system. One embodiment of the valve mechanism is provided for use with a brake system using a closed center valve structure and another modification is provided for use with a brake system utilizing an open center valve structure.

In the drawings:

FIGURE 4 is a schematic diagram having components of the system of FIGURE 3 shown with parts broken away and in section.

Figure 1:
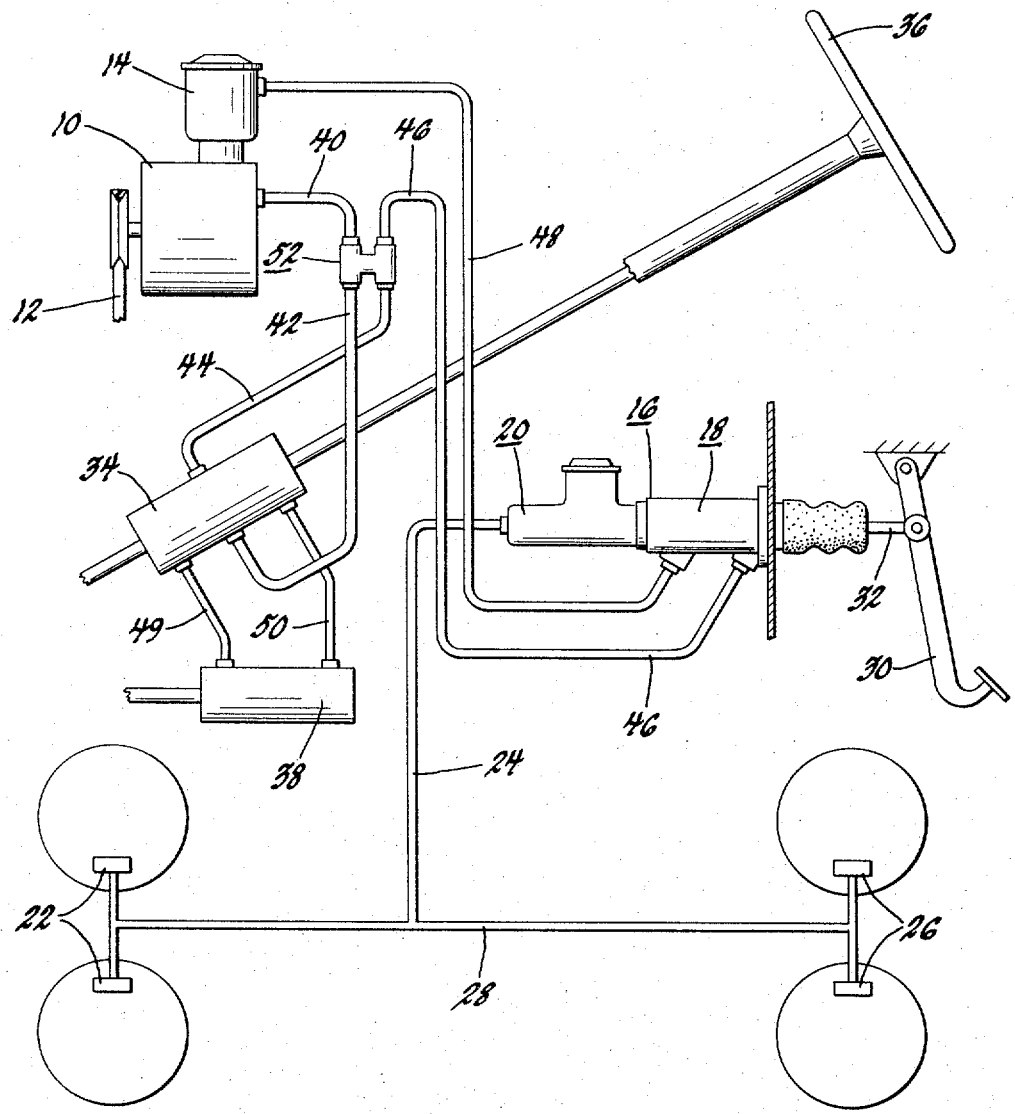
FIGURE 1 is a schematic diagram of a hydraulic power system for a vehicle power steering gear and a vehicle power brake, and including the valve mechanism embodying the invention.

In the system of FIGURE 1 the hydraulic pressure generating pump 10 is driven by a suitable drive such as the belt drive 12 which may be connected to be driven by the engine of the vehicle in which the system is installed. The reservoir 14 contains fluid supplied to the pump 10. A power brake assembly 16 is provided and includes a power booster section 18 and a master cylinder assembly 20. Master cylinder assembly 20 provides pressurized fluid to the front brake wheel cylinders 22 through the conduit 24 and to the rear brake wheel cylinders 26 through the same conduit. Conduit 24 may be connected to a suitable conduit system 28 leading to the separate wheel cylinder assemblies.

The vehicle operator controls operation of the power brake assembly 16 by means of the suitably mounted brake pedal 30 acting on the push rod 32. He also controls the power steering gear system of the vehicle by operating the power steering gear valve assembly 34 by means of the steering wheel 36. Valve assembly 34 controls the delivery of pressurized fluid to the power steering gear booster 38. Pressure is provided to the power steering gear valve assembly 34 through the conduit 40 receiving pressurized fluid from the pump 10 and delivering it to the valve assembly 52, which is the subject of the invention. Conduit 42 delivers fluid from the valve assembly 52 to the power steering gear valve assembly 34, and pressurized fluid is delivered from assembly 34 to another part of the valve assembly 52 through the conduit 44. Conduit 46 delivers the pressurized fluid from valve assembly 52 to the power brake booster assembly 18 and the fluid is then returned to the reservoir 14 through the conduit 48. Conduits 49 and 50 interconnect the power steering gear valve assembly 34 with the power steering gear booster 38 to provide pressurized fluid and fluid return between those components. The system is shown in somewhat greater detail in FIGURE 2.

Figure 2:
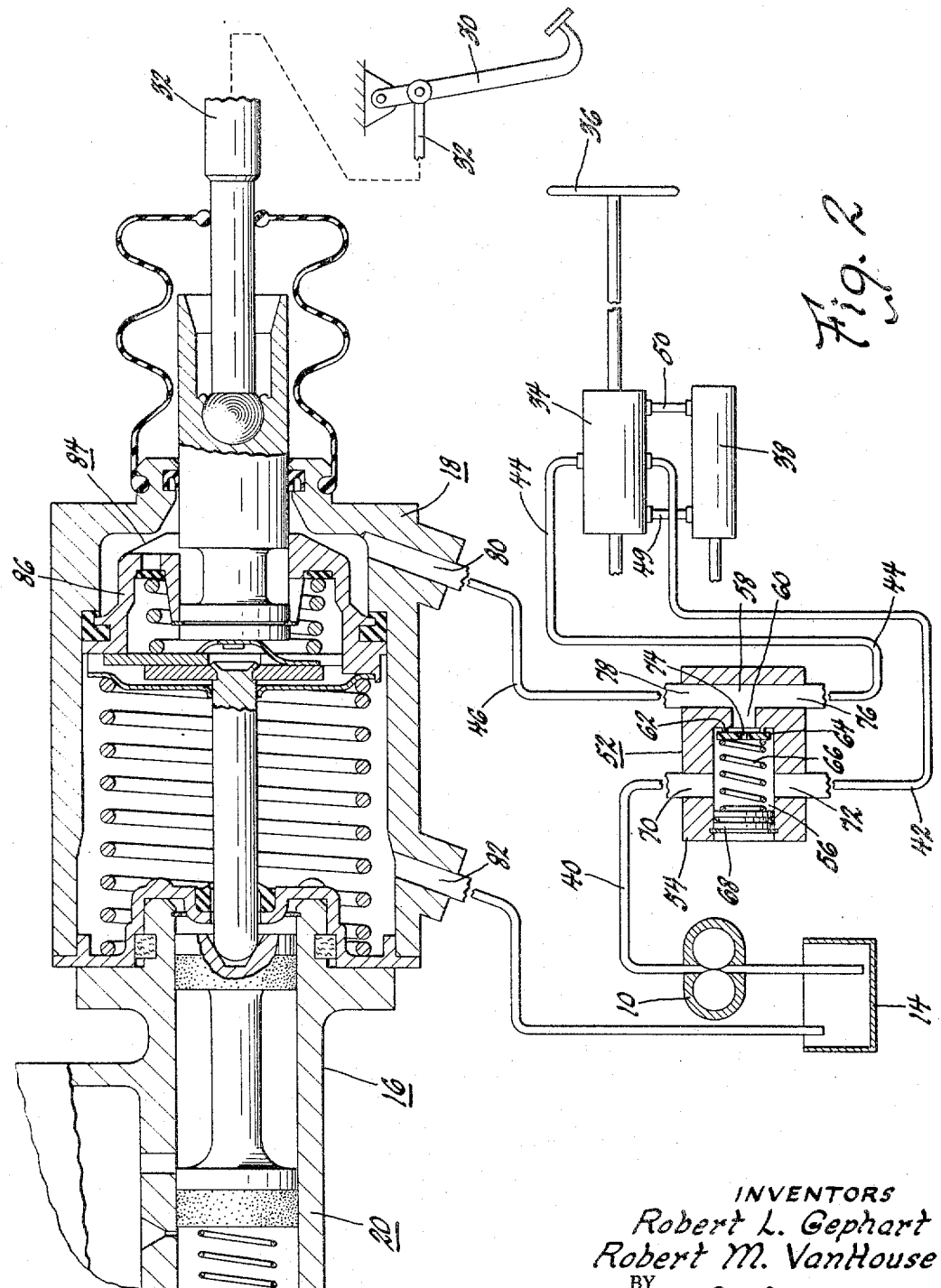
FIGURE 2 is a schematic representation of certain components of the system of FIGURE 1, portions thereof being broken away and in section.

The valve assembly 52 is shown schematically in section in FIGURE 2. This assembly includes a housing 54 in which is provided a first chamber 56. A second chamber 58 provided in the housing is connected by a passage 60 to chamber 56. A valve seat 62 is formed about the end of passage 60 opening into chamber 56 and a check valve 64 is urged against the seat by the check valve spring 66. Spring 66 is positioned in chamber 56 and is held in place by plug 68 which also closes one end of chamber 56. An inlet 70 and an outlet 72 are provided for chamber 56, with conduit 40 being connected to inlet 70 and conduit 42 being connected to outlet 72. Check valve 64 is provided with an orifice 74 since the valve assembly 52 is utilized with an open center valve control mechanism for the power brake mechanism. As will be later described, the valve assembly is modified for use with a closed center system by eliminating the orifice 74. This modification is shown in FIGURE 4. Valve assembly 52 is provided with a second inlet 76 and a second outlet 78 which are connected with chamber 58. Conduit 44 is connected to inlet 76 and conduit 46 is connected to outlet 78. As is shown in some detail in FIGURE 2, the power brake booster assembly 18 is of the open center type wherein fluid flowing into the booster inlet 80 flows through the booster and out the booster outlet 82. When the brakes are applied by operating the brake pedal, the booster valve control mechanism 84 restricts the flow of pressurized fluid through the booster and builds up a pressure which acts on the booster piston 86 to actuate the master cylinder assembly 20 to apply the vehicle brakes by power.

During normal conditions of operation the pump 10 delivers pressurized fluid through conduit 40 to inlet 70 of the valve assembly 52. The pressurized fluid is then delivered through chamber 56 and outlet 72 to the power steering gear valve 34 from conduit 42. The check valve 64 is held seated against its seat 62 by the spring 66 so that it closes passage 60. Pressure in chamber 56 also aids in holding the valve closed. Thus the pressurized fluid is normally delivered to the power steering gear valve assembly 34. This valve assembly is of the open center type so that pressurized fluid is returned through conduit 44 to the inlet 76 of valve assembly 52. However, when the power steering gear is turned fully to the right or left against its stops, no fluid will flow through it and therefore no pressurized fluid is delivered to inlet 76. Since pressurized fluid must be available to the power brake through conduit 46, the orifice 74 through valve 64 allows flow and sufficient pressure to be delivered to chamber 58 to operate the power brake under this momentary condition. It is obvious, however, that the power brake will not have to be operated extensively while the operator has the vehicle wheels turned either full left or full right.

Check valve 64 will open when the pump 10 provides insufficient pressure to chamber 56 although fluid pressure still exists in the system as a whole. This may occur upon loss of fluid in the reservoir 14. Thus the pressure in the system will be available to the power component. Under some conditions an accumulator may be provided for this purpose. The system of FIGURES 3 and 4 utilizes such an accumulator. Check valve 64 will also open when pressure builds up in conduit 46 to the blocking of pressure flow in the power brake booster. This will occur in the open center brake system disclosed in FIGURE 2 when the brake is applied, or will occur in a closed center system such as the system of FIGURE 4 when the unloading valve is closed. The check valve 64 must be open under these conditions, since fluid must be able to be pumped by the pump 10 to the steering gear mechanism 34 in order to operate the power steering gear under these conditions. Thus pressurized fluid does not flow through the conduit 46 to the power brake under these conditions, but, instead, returns from the power steering gear valve assembly 34 through the conduit 44 to chamber 58 and then through passage 60 in chamber 56. Pump 10 can, therefore, keep the power steering system and the power brake system pressurized and a fluid block preventing further movement of the power steering gear will not occur.

As noted above, the system of FIGURES 3 and 4 is generally similar to that of FIGURES 1 and 2, but with the brake system being of the closed center valve control mechanism type. The system is also similar to that disclosed and claimed in application Ser. No. 291,119, now Patent No. 3,170,536, filed in the name of Robert M. Van House et al. on even date herewith, and entitled "Hydraulic Power Brake and Power Steering System." The disclosure of that application is, therefore, incorporated as if fully reproduced herein.

Figure 3:
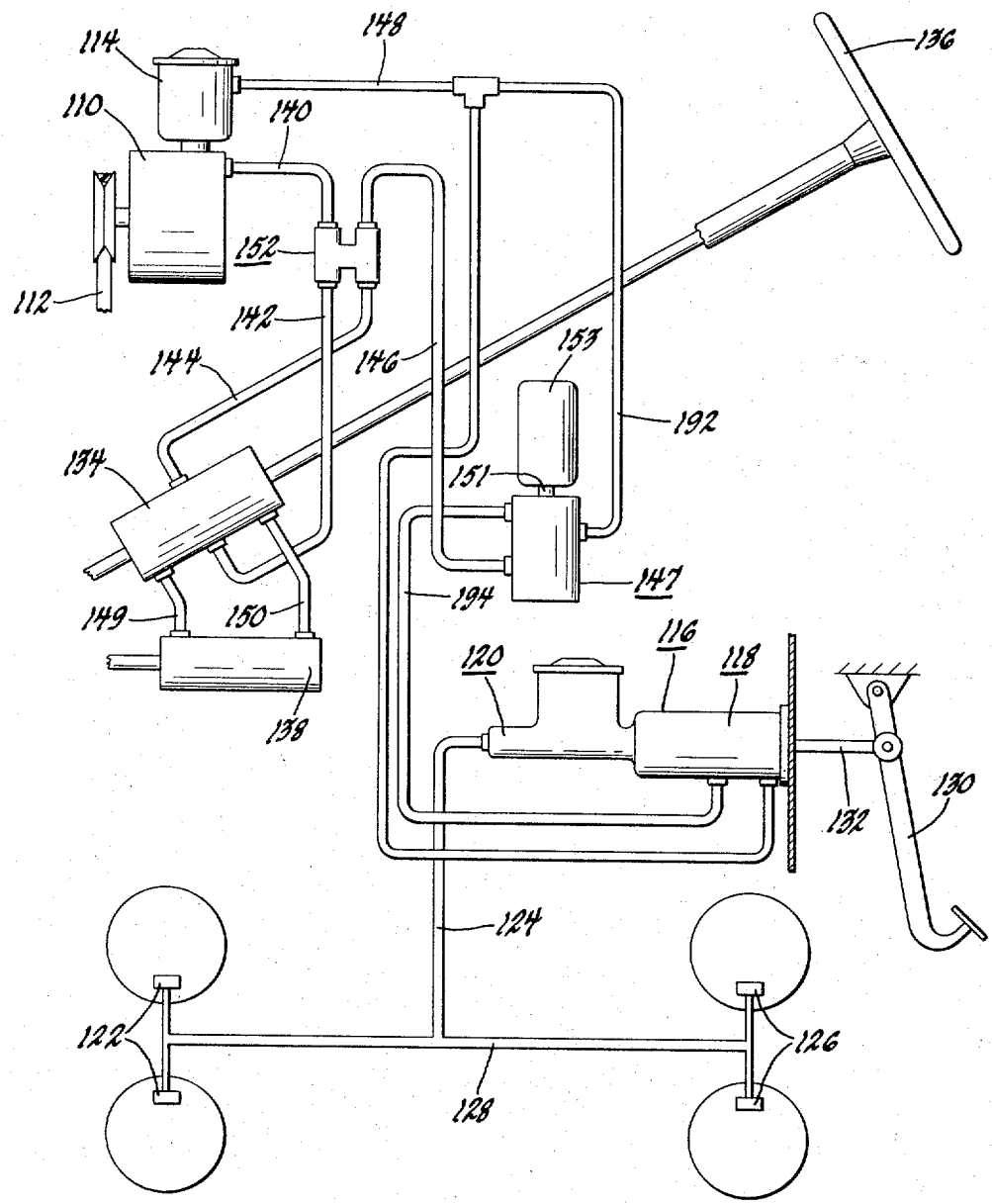
FIGURE 3 is a schematic diagram of a modified system similar to the system of FIGURE 1.

The system of FIGURES 3 and 4 is generally similar to that of FIGURES 1 and 2 and related reference characters are used therein as appropriate. The pump 110 driven by the belt drive 112 is provided with a fluid reservoir 114. The system includes a power brake assembly 116 comprising a power booster section 118 and a master cylinder assembly 120. The master cylinder assembly 120 provides pressurized fluid to the front brake wheel cylinders 122 and the rear brake wheel cylinders 126 through conduits 124 and 128.

The power brake assembly 116 is controlled by the vehicle operator through the brake pedal 130 acting on the push rod 132. The power steering gear system is controlled through the power steering gear valve assembly 134 by movement of the steering wheel 136. Valve assembly 134 controls delivery of pressurized fluid to the power steering gear booster 138. Pressure is provided to the valve assembly 134 through the conduit 140, which receives pressurized fluid from the pump 110 and delivers it to the valve assembly 152. Conduit 142 delivers fluid from the valve assembly 152 to the valve assembly 134. Pressurized fluid is delivered from valve assembly 134 to another portion of the valve assembly 152 through conduit 144. Conduit 146 delivers pressurized fluid from valve assembly 152 to bypass valve assembly 147. The conduit 194 delivers fluid from the bypass valve to the power booster assembly 118 and fluid exhaust from the booster is returned to the reservoir 114 through the conduit 148. Conduits 149 and 150 interconnect the power steering gear valve assembly 134 with the power steering gear booster 138 to provide pressurized fluid and fluid return between these components. The system also includes an accumulator 153 connected by conduit 151 to the bypass valve assembly 147.

The valve assembly 152, the bypass valve assembly 147, the power brake assembly 116, and the accumulator 153 are schematically illustrated in section in FIGURE 4. The valve assembly 152 includes a housing 154 in which is formed a first chamber 156 and a second chamber 158. A passage 160 connects chambers 156 and 158. A valve seat 162 is formed about the end of passage 160 opening into chamber 156 and a check valve 164 is urged against the seat by the check valve spring 166. Plug 168 closes one end of chamber 156 and holds spring 166 in place in that chamber. Chamber 156 is provided with an inlet 170 and an outlet 172, with conduit 140 being connected to inlet 170 and conduit 142 being connected to outlet 172. A second inlet 176 and a second outlet 178 formed in housing 154 are connected with chamber 158. Conduit 144 is connected to inlet 176 and conduit 146 is connected to outlet 178.

As shown in some detail in FIGURE 4, the power brake booster assembly 118 is of the closed center type wherein fluid flowing into the booster inlet 180 is normally not permitted to flow through the valve assembly 184. When the brakes are applied by operating the brake pedal, fluid is permitted to flow through the booster and is exhausted through the booster outlet 182. Pressure is also built up in the booster under this condition so that it acts against the piston 186 to operate the master cylinder assembly 120 and apply the vehicle brakes by power.

The valve assembly 152 operates in the same manner as does the valve assembly 52 earlier described with the exception that when the valve 164 is seated against its seat 162, there is no pressure or fluid flow connection between chambers 156 and 158 through passage 160 since valve 164 has no orifice through it. Under normal conditions of operation with the brakes released the pump 110 supplies pressure to the open type power steering gear valve assembly 134 and then to the bypass valve assembly 147 through conduit 146 which is connected to the bypass valve assembly inlet 188. Bypass valve assembly 147 is described in greater detail in the copending patent application Ser. No. 291,073, filed on even date herewith in the name of Robert M. Van House and entitled "Belleville Spring Controlled Bypass Valve." The disclosure of that application is, therefore, incorporated as if fully reproduced herein. It is noted that as pressure is provided at the valve inlet 188 it overcomes a check valve in the assembly and passes through the outlet 196 and through conduit 194 to the booster inlet 180. This pressure is also delivered through the bypass valve outlet 198 to the accumulator 153. The accumulator pressure at outlet 198 acts on the bypass valve so as to bypass excessive pressure through the bypass valve outlet 190 and conduit 192, which is in turn connected to the conduit 148 to deliver the bypass fluid to the reservoir 114.

Since under the operating and charged condition a static pressure is supplied to the accumulator 153 and the booster assembly 118, and this pressure is also found in the chamber 158 of valve assembly 134, check valve 164 will open as necessary to permit fluid to pass from the steering gear valve assembly 134 and prevent that assembly from being hydraulically blocked. If pump 110 is unable to provide sufficient fluid to maintain the necessary pressure to operate the system, the accumulated pressure in accumulator 153 will enter bypass valve assembly outlet 198 and pass through the assembly to outlet 196 and then directly to the power brake assembly through conduit 194 and booster inlet 180, thus providing emergency power brake operation even though the primary source of power has failed.

In the claims:

1. In a fluid power system: a source of fluid pressure; a power steering motor and a power brake motor selectively operable by fluid pressure from said source; and a pressure distributing valve assembly comprising, a housing having a first chamber and a second chamber formed therein and a passage interconnecting said chambers and a first inlet and a first outlet for said first chamber and a second inlet and a second outlet for said second chamber, and a check valve in said first chamber having means urging said valve to close said passage, said first outlet and said second inlet being interconnected through one of said motors and said second outlet being connected to the other of said motors for operation of each of said motors independently of the other.

2. In the system of claim 1, said check valve having a restrictive orifice therethrough providing restricted flow interconnection between said first and second chambers when said check valve is seated for delivering pressure to said second chamber independently of said first outlet and said second inlet for power operation of said other motor independently of said one motor.

3. In the system of claim 1, said check valve completely closing said passage when seated and opening upon a predetermined pressure differential in said second chamber relative to said first chamber to bypass fluid from said second chamber to said first chamber and therefore bypass said one motor to give operational power preference to said other motor.

4. In the system of claim 3, said one motor being the power steering motor and said other motor being the power brake motor.

References Cited

UNITED STATES PATENTS 1,781,404  11/1930  McNab _____ 137—116

FOREIGN PATENTS 164,981  1/1950  Austria.
69  1911  Great Britain.

WILLIAM F. O'DEA, *Primary Examiner.*

D. LAMBERT, *Assistant Examiner.*